Patented Feb. 15, 1949

2,462,047

UNITED STATES PATENT OFFICE 2,462,047

PENTAERYTHRITOL CONDENSATION PRODUCTS

Joseph A. Wyler, Allentown, Pa., assignor to Trojan Powder Company, a corporation of New York No Drawing. Application April 26, 1946, Serial No. 665,321

3 Claims. (Cl. 260—615)

This invention relates to higher condensation products of pentaerythritol and particularly to those made by condensing at least 5 molecules of the pentaerythritol into one molecule with the elimination of water. The invention relates also to the method of making condensation products of pentaerythritol.

It is well known that pentaerythritol (sometimes written P. E.) is represented by the formula $C(CH_2OH)_4$ and is closely related to other polyhydric alcohols of which the glycols, glycerine, and mannitol are examples. When these other polyhydric alcohols are heated with a dehydrating acid such as sulfuric under such conditions as to decrease the percentage of hydroxy groups, they are decomposed to materials of lower molecular weight. Glycerine, for instance, gives acrolein. I have now found, however, that when I heat pentaerythritol with sulfuric or like acid, the pentaerythritol is converted to products of higher molecular weight and lower content of hydroxyl groups.

These products of higher molecular weight may be described as condensation products and are ether alcohols which represent a plurality of molecules of pentaerythritol less water which is removed during the condensation. If n mols of pentaerythritol are condensed together by my method, the product will have the composition represented empirically by $$[C(CH_2OH)_4]_n - (n-1)H_2O$$

or, more exactly, $(C_5H_{12}O_4)_n - (n-1)H_2O$. In condensing together 4 mols. of P. E., for instance, 3 mols. of water are removed and the product is tetra P. E.

I have further found that most at least of the condensation products of pentaerythritol so made have lower melting points than the less complex pentaerythritol itself. They are useful in giving with drying oil fatty acids, for example, resins of a greater viscosity and bodying power when in molten or dissolved condition then comparable resins made with pentaerythritol and are particularly desirable for this purpose when $n$ in the above formula is more than 4 and preferably 5 to 10.

Briefly stated, the invention comprises the method of condensing pentaerythritols with themselves or with other pentaerythritols by treatment with a dehydrating acid at elevated temperatures at which water boils away and preferably above the melting point of the condensation products formed by the treatment. The invention comprises also the penta, hexa, octa, nona, and deca condensation products described later herein.

The condensation of the pentaerythritols is considered to involve the formation of the monoether at an early stage in the reaction and the subsequent reaction of this monoether with additional molecules of the pentaerythritol. There is evidence, that pentaerythritol in contact with an acid such as sulfuric and at the elevated temperatures of my reaction, forms first the monoether of the formula

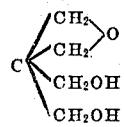

The ether is then considered to react with other molecules of the pentaerythritol or pentaerythritols present to give the desired condensation product or products. The monoether reacts with two hydroxy groups of the same or different molecules of the P. E. compound to be condensed, as follows:

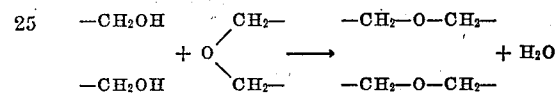

In greater detail, the illustrative reaction of P. E. with its monoether is as follows:

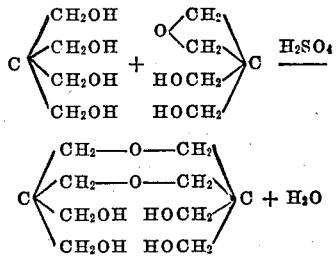

Using 2 mols of P. E. to 1 of the anhydride, the product becomes

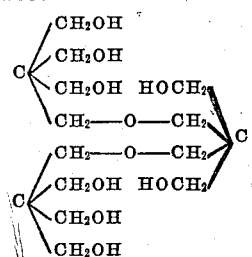

In another type of reaction hydroxyl groups of different molecules of the pentaerythritols, in contact with the dehydrating acid, form an —O— or ether bridge between the two molecules with the elimination of water.

Regardless of the exact mechanism which may finally be proved for my condensation reaction, it is a fact that the reaction proceeds smoothly with a negligible loss of material except for the water removed, and gives a mixture of the higher pentaerythritols having ether linkages between the originally distinct molecules and containing as many as 35 or somewhat more carbon atoms. The mixture ordinarily contains some unchanged pentaerythritol as well as the ether-alcohol condensation products of the pentaerythritols.

Among the pentaerythritols to be used as raw material there may be selected any of those now known, including pentaerythritol itself, the di-, tri-, or tetrapentaerythritol, or mixtures of them. Also there may be used any of the various isomers of these pentaerythritols so long as all the OH groups occur in the primary alcohol grouping $CH_2OH$ and either pure or commercial forms of them.

The mono-, di-, and tripentaerythritols described may be made by conventional methods. The tetrapentaerythritol may be made as described in my copending application Serial No. 650,387, filed February 20th, 1946, now abandoned, entitled Tetrapentaerythritol decanitrate.

As the acid to be used there is employed an oxygen-containing dehydrating acid that is non-oxidizing, that is, non-oxidizing under the conditions of use. Examples of such acids that may be used are those containing sulfur and phosphorus among which are sulfuric, sulfurous, phosphoric, and phosphorus acid. Also there may be used mixtures of these acids with each other or with sulfur dioxide.

The acids may be added to the reaction mixture in commercially concentrated form with vigorous stirring but are preferably diluted before admixture with the pentaerythritol or pentaerythritols, so as to avoid contact of the concentrated acid even momentarily with the material to be condensed.

The proportion of the dehydrating acid used is ordinarily 0.1% to 10% of the weight of the penta compounds to be condensed. For best results, the proportion of the acid is within the range 0.1% to 1% although with weaker acids such as phosphoric acid the preferred proportion is about 1% to 5% and ordinarily around 2% of the weight of the pentaerythritol compounds to be condensed.

Buffers that decrease acidity may be used with the acids to control the pH, representative buffers that are satisfactory being borax, secondary sodium phosphate, and potassium sulfite. The use of buffers, while retarding the reaction somewhat, results in products less discolored than those obtained under similar conditions without the use of buffers.

The temperature at which the mixture of the selected raw materials is heated to cause the condensation is that at which water is boiled away at a reasonably rapid rate, under the prevailing pressure and is suitably above the melting point of the condensation products to be formed in the reaction but below the temperature of objectionable pyrolysis of them. Suitable temperatures are 200° to 270° C., 200° being used in Example 4.

The temperature of heating may be lowered somewhat after the reaction is initiated because the products of the condensation have lower melting points than the original pentaerythritol compound used. When, for instance, there is made a mixture of 97 parts of pentaerythritol and 3 parts of phosphoric acid and the mixture heated to melting at about 220° C., there is first formed a translucent gel which quivers when shaken. As the temperature is maintained at this point, the gel is converted to a liquid of low viscosity, the melting point of the mixture falling as the condensation with the elimination of water proceeds.

As to the pressure at which the reaction is carried out, this may be atmospheric, sub-atmospheric or super-atmospheric pressure, although sub-atmospheric pressures are preferred. With the latter, lower temperatures and greater speeds of dehydration are obtained, enabling the preparation of better colored products. Also, the reaction may be carried out with the use of a stream of inert gas, such as $CO_2$, nitrogen, or argon bubbled through the reaction mixture to carry out water vapor.

The period in which the mixture is heated to effect the condensation varies from a few minutes to as much as several hours, the exact time depending upon the composition of the mixture used and the extent of the condensation desired. The stronger the dehydrating effect of the acid in the proportion used, other things being equal, the shorter is the time required for the condensation. Likewise, more severe conditions or longer periods of heating are required to make the higher condensation products of pentaerythritol as, for instance, those containing 5 to 10 times as many carbon atoms as contained in the original molecule of the penta compound used.

Proceeding as described, there are made such higher condensation products of pentaerythritol as the penta, hexa, hepta, octa, nona, and deca condensation products containing 25, 30, 35, 40, 45, and 50 carbon atoms, respectively, to the molecule.

These higher condensation products are suitably used in mixture with each other, to give with the drying oil fatty acids, for instance, esters that have very great bodying power and are free from any sharp solidification point.

Particularly satisfactory results in the making of resinous esters are obtained when the condensation products of pentaerythritol are within critical limits. I have found that the mixed products which contain a large proportion of the penta to deca condensation products and even somewhat higher than the deca, that is, products containing 33.53% to 26% of hydroxy group, form rapid-bodying resins from mixtures of rosin and talloil. These resins have the property of rapidly bodying drying oils and resinous compositions such as those used, for instance, in the making of printing ink and finishing compositions. The mixture of the pentaerythritol condensation products which gives the best results for the production of rapid bodying resins is a mixture containing about 30% of OH group.

The invention will be further illustrated by detailed description in connection with the following detailed examples of the practice of it, proportions being by weight.

EXAMPLE 1

199 parts of pentaerythritol, of melting point 250° C. or slightly above, were placed in a suitable heating vessel provided with mechanical stirring, treated with 1.2 parts of 85% phosphoric acid, and stirred to obtain a uniform mixture. The latter was then heated to 255°–260° C. where the mixture boiled vigorously, with the evolution of water. At the end of ½ hour at this temperature, the evolution of water ceased and the molten mass was run into pans to solidify.

The product was only slightly colored. It was pulverized, analyzed for hydroxyl content and found to contain only 42.6% OH, whereas the original pentaerythritol contained 49.5% OH. It is a mixture of hydroxy-ether condensation products of pentaerythritol.

The water liberated was in excess of 9.0 parts.

(By contrast, if pure pentaerythritol, without the addition of phosphoric acid, is heated to this same temperature or higher, decomposition and discoloration take place, the pentaerythritol molecule breaks down with the liberation of $CO_2$, aldehydes, water and odoriferous materials and the formation of a rubbery residue, instead of merely liberating water.)

EXAMPLE 2

200 parts of a mixture consisting essentially of 99% pentaerythritol and 1% of phosphoric acid were treated generally as described under Example 1.

In this case, the mixture started to melt at 240° C. and a copious evolution of water took place at 250° C. At 260° C. the mixture boiled vigorously. The temperature having reached 260° C., it was immediately dropped to 245–255° C. and held here for ½ hour, after which the whole reaction mass was poured into pans to cool and solidify.

The product was light in color and upon analysis was found to contain 37.34% OH and 0.56% acid calculated as $H_3PO_4$.

A total of 15 parts of water was removed from the pentaerythritol.

EXAMPLE 3

200 parts of a mixture were used consisting of 97% pentaerythritol and 3% phosphoric acid and the procedure was essentially the same as in Example 1.

In this run the mixture melted at about 220° C. It was held at 220–230° C. for about 15 minutes. It did not liberate any appreciable amount of water at this temperature. When heated to about 240° C., it boiled and gave off water. The mixture was then held at a temperature range of about 230–240° C. for ½ hour when it was poured into cooling pans.

The product was light in color and almost white after pulverizing. It was hard and brittle, with no signs of being tacky. It contained 34.69% OH and 1.74% acidity calculated as phosphoric acid.

A total of 16 parts of water was liberated.

EXAMPLE 4

200 parts of a mixture consisting of pure pentaerythritol and sulfuric acid in the proportions of 99.8 parts of pentaerythritol to 0.2 part of sulfuric acid were heated in essentially the same manner as in Example 1. In this case, when the temperature of the mixture reached 200° C., water was being liberated at a rapid rate. The temperature was held at 220–235° C. for about 15 minutes, when the content of the vessel was discharged into a cooling pan.

The cooled product was found to contain 39.19% OH and was hard and brittle.

EXAMPLE 5

In duplicate runs with the same ingredients as in Example 4, but a longer heating time of about 45 minutes and a somewhat higher temperature of 245°–250°, the product obtained was rubbery when hot and resin-like when cold. The hydroxyl content of this product was about 20% OH, a percentage corresponding to the hydroxy content of condensation products above decapentaerythritol.

In other similar tests it was found that the hydroxyl content of this final product bore a direct relation to the water liberated. Thus, when an amount of water equal to 4% of the weight of pentaerythritol started with is driven out, the hydroxyl content of the final product was found to be 42.21% OH; with a 5% water liberation, the hydroxyl content was found to be 39.19%; and with a 7.5% water liberation, the hydroxyl content was found to be 34.35% corresponding to the hydroxy group content of tetrapentaerythritol (Theory 34.6%).

In still other experiments using as much as 2% $H_2SO_4$ on the weight of the pentaerythritol started with, the same dehydrating effect was obtained except that the temperatures and times required for the formation of a product of a given —OH content were less. In general an 0.2–0.3% $H_2SO_4$ proportion is preferred.

In the preparations described under Examples 1–5 above, polypentaerythritols containing 10, 15, or 20 carbon atoms to the molecule, representing the di-, tri-, or tetrapentaerythritols, may be substituted pound for pound for the pentaerythritol and the treatment carried out exactly as described in the examples. With such substitutions it is to be understood, however, that the products made will have a lower percentage of hydroxyl content and a larger number of carbon atoms to the molecule than those obtained under any given set of conditions specified in the examples.

In general, the condensation products made as described herein are solids at ordinary temperatures but melt when heated and are free flowing liquids at temperatures of the order of 175° to 250° C. or somewhat lower for those condensation products that represent the major proportion of the mixed product. Those that contain more than 20 carbon atoms to the molecule are practically insoluble in water, the solubility being less than 0.2 part for 100 parts of water at room temperatures.

In connection with the interpretation of the hydroxy content of the condensation products made in the examples, the following table is of interest. It shows data for pentaerythritol and of condensation products that may be made by condensing 2 molecules of the pentaerythritol, 3 molecules, and so on up to 10 molecules.

*Constants of pentaerythritols*

| Type | Empirical Formula | Molecular Weight | Per Cent OH | Number of OH Groups |
|---|---|---|---|---|
| Mono-Pentaerythritol | $C_5H_{12}O_4$ | 136.15 | 49.98 | 4 |
| Di-Pentaerythritol | $C_{10}H_{22}O_7$ | 254.30 | 40.13 | 6 |
| Tri-Pentaerythritol | $C_{15}H_{32}O_{10}$ | 372.41 | 36.53 | 8 |
| Tetra-Pentaerythritol | $C_{20}H_{42}O_{13}$ | 490.54 | 34.67 | 10 |
| Penta-Pentaerythritol | $C_{25}H_{52}O_{16}$ | 608.67 | 33.53 | 12 |
| Hexa-Pentaerythritol | $C_{30}H_{62}O_{19}$ | 726.80 | 32.76 | 14 |
| Hepta-Pentaerythritol | $C_{35}H_{72}O_{22}$ | 844.93 | 32.21 | 16 |
| Octa-Pentaerythritol | $C_{40}H_{82}O_{25}$ | 963.06 | 31.79 | 18 |
| Nona-Pentaerythritol | $C_{45}H_{92}O_{28}$ | 1,081.19 | 31.46 | 20 |
| Deca-Pentaerythritol | $C_{50}H_{102}O_{31}$ | 1,199.32 | 31.20 | 22 |

The various condensation products made as described are useful particularly in the making of resins.

In making a representative resin, drying oil fatty acids of which those from linseed oil are examples are mixed in proportion approximately equivalent to the condensation product and the resulting mixture heated in an open dish, or in conjunction with a stream of inert gas bubbled through the mixture, until test for acidity shows almost complete neutralization of the acids by the P. E. compound. Thus, the acidity is reduced to 1% or less, to give the resinous ester of the P. E. compound and the linseed oil acids.

Particularly satisfactory results are obtained when the P. E. condensation product used is not a single polypentaerythritol but a mixture of all of those obtained in the condensation herein and containing two or more units of pentaerythritol condensed into one ether alcohol condensation product, as, for instance, the di- to decapentaerythritols. To make these mixed esters the product of the condensation above is esterified with the selected drying oil fatty acid as, for example, those from linseed, soyabean, or dehydrated castor oil.

The mixed pentaerythritols before esterification may be decolorized as by being dissolved in aqueous alcoholic solution and passed over decolorizing carbon and the decolorized solution then heated to expel alcohol and evaporate water to such concentration that the dissolved compounds crystallize on cooling, the crystallization being repeated by evaporation of the mother liquor obtained until substantially all of the pentaerythritol compounds have been recovered by crystallization. The various fractions so obtained are then combined for use in making the resinous esters.

The resins so made are useful in bodying other commercial resins which when melted or dissolved are of viscosity objectionably low for certain commercial uses, in synthetic drying oils, and in printing inks of compositions that are usual in each case except for the inclusion of my new esters.

It will be understood also that it is intended to cover all changes and modifications of the examples of the invention herein chosen for the purpose of illustration which do not constitute departures from the spirit and scope of the invention.

What I claim is:

1. In making condensation products of pentaerythritols, the method which comprises forming a mixture of the selected pentaerythritol with 0.1 to 1 part of sulfuric acid for 100 parts of the pentaerythritol, heating the resulting mixture to a temperature of 200° to 270° C., and continuing the heating to maintain the mixture in fluid condition until test shows reduction of the hydroxyl content to approximately 26% to 40.1% of the weight of the remaining pentaerythritol compound.

2. In making condensation products of pentaerythritols, the method which comprises forming a mixture of the selected pentaerythritol with 0.1 part to 10 parts of a dehydrating acid that is non-oxidizing under the conditions of use, and heating the resulting mixture at a temperature to 200° to 270° C. until the hydroxy content is reduced to not more than 40.1% of the weight of the remaining pentaerythritol compound.

3. A composition of matter comprising a mixture of penta-, hexa-, hepta-, octa-, nona-, and decapentaerythritol and being of the general formula $(C_5H_{12}O_4)_n-(n-1)H_2O$, $n$ being an integral number within the range 5 to 10.

JOSEPH A. WYLER.

REFERENCES CITED

The following references are of record in the file of this patent:

UNITED STATES PATENTS

| Number | Name | Date |
|---|---|---|
| 2,062,404 | Dreyfus | Dec. 1, 1936 |
| 2,110,695 | Batchelder | Mar. 8, 1938 |
| 2,275,494 | Bennett | Mar. 10, 1942 |
| 2,334,565 | Lieber et al. | Nov. 16, 1943 |
| 2,401,749 | Burghardt et al. | June 11, 1946 |

OTHER REFERENCES

Burrell et al., "Paint, Oil & Chemical Review," vol. 107, No. 24, pages 14 to 20 (Issue of Dec. 14, 1944).